United States Patent
Cramer et al.

(10) Patent No.: US 10,733,434 B2
(45) Date of Patent: Aug. 4, 2020

(54) METHOD AND SYSTEM FOR ACCURATELY DETECTING, EXTRACTING AND REPRESENTING REDACTED TEXT BLOCKS IN A DOCUMENT

(71) Applicant: International Business Machines Corporation, Armonk, NY (US)

(72) Inventors: Keith D. Cramer, Pine Island, MN (US); Christophe Resse, Annemasse (FR)

(73) Assignee: International Business Machines Corporation, Armonk, NY (US)

(*) Notice: Subject to any disclaimer, the term of this patent is extended or adjusted under 35 U.S.C. 154(b) by 128 days.

(21) Appl. No.: 16/139,884

(22) Filed: Sep. 24, 2018

(65) Prior Publication Data
US 2020/0097713 A1    Mar. 26, 2020

(51) Int. Cl.
G06K 9/00    (2006.01)

(52) U.S. Cl.
CPC ..... *G06K 9/00456* (2013.01); *G06K 9/00449* (2013.01); *G06K 9/00463* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 5,903,646 A * | 5/1999 | Rackman | G06F 21/6218 380/54 |
| 7,885,944 B1 | 2/2011 | Bruening | |
| 8,181,261 B2 * | 5/2012 | Sperry | G06F 21/6245 380/243 |
| 8,649,552 B2 | 2/2014 | Balakrishnan et al. | |
| 2009/0164881 A1 | 6/2009 | Segarra et al. | |
| 2013/0272523 A1 * | 10/2013 | McCorkindale | H04N 1/44 380/243 |
| 2014/0149363 A1 | 5/2014 | Leeds | |
| 2014/0212040 A1 * | 7/2014 | Walker | G06K 9/2081 382/182 |
| 2014/0281871 A1 | 9/2014 | Brunner et al. | |
| 2015/0071542 A1 * | 3/2015 | Dahl | G06K 9/00852 382/177 |
| 2015/0378973 A1 | 12/2015 | Korneev | |
| 2016/0012027 A9 | 1/2016 | Rebstock et al. | |

OTHER PUBLICATIONS

Prateek Sarkar, "Document Image Analysis for Digital Libraries," IWRIDL '06 Proceedings of the 2006 international workshop on Research issues in digital libraries, Article No. 12.
(Continued)

*Primary Examiner* — Bernard Krasnic
(74) *Attorney, Agent, or Firm* — Terrile, Cannatti & Chambers, LLP; Michael Rocco Cannatti

(57) ABSTRACT

A computer-implemented method, system and a computer program product are provided for automatically detecting redaction blocks in an image file document by analyzing the document to identify any redaction block areas and then detecting location information for each redaction block area identified in the document which may be mapped to any associated text fragments in the document based on the location information for each redaction block area and text fragment in the document.

17 Claims, 5 Drawing Sheets

(56) References Cited

OTHER PUBLICATIONS

Richard Chow et al., "Sanitization's slippery slope: the design and study of a text revision assistant," SOUPS '09 Proceedings of the 5th Symposium on Usable Privacy and Security, Article No. 13, 2009.
Yifang Li et al., "Effectiveness and Users' Experience of Obfuscation as a Privacy-Enhancing Technology for Sharing Photos," Proceedings of the ACM on Human-Computer Interaction archive, vol. 1 Issue CSCW, Nov. 2017, Article No. 67.
William Brennan, "The Declassification Engine: Reading Between the Black Bars," The New Yorker, Oct. 16, 2013, http://www.newyorker.com/tech/elements/the-declassification-engine-reading-between-the-black-bars.
stackoverflow.com, "Locating 'Black Rectangles' on an Image—Language Independent," https://stackoverflow.com/questions/22901391/locating-black-rectangles-on-an-image-language-independent, printed Jun. 9, 2018.
opencv.org, "Face Detection using Haar Cascades," http://docs.opencv.org/trunk/d7/d8b/tutorial_py_face_detection.html, printed Jun. 9, 2018.
Adrian Rosebrock, "Finding Shapes in Images Using Python and OpenCV," pyimagesearch, http://www.pyimagesearch.com/2014/10/20/finding-shapes-images-using-python-opencv/, Oct. 20, 2014.

\* cited by examiner

20

```
<?xml version-"1.0"?>
<Document>
    <element>
        <type>text-value</type>
        <Label>
            <text>DOCUMENT TITLE</text>
            <x-cord>5</x-cord>
            <y-cord>20</y-cord>
        </Label>
        <data-value>
            <text>PROPOSED INSURED</text>
            <x-cord>5</x-cord>
            <y-cord>25</y-cord>
        </data-value>

<type>text-value</type>
        <Label>
            <text>NAME(FIRST, MIDDLE, LAST)</text>
            <x-cord>5</x-cord>
            <y-cord>20</y-cord>
        </Label>
        <data-value>
            <text>++REDACTED++</text>
            <x-cord>5</x-cord>
            <y-cord>27</y-cord>
        </data-value>
    </element>
    .
    .
    .
</Document>
```

METHOD AND SYSTEM FOR ACCURATELY DETECTING, EXTRACTING AND REPRESENTING REDACTED TEXT BLOCKS IN A DOCUMENT

BACKGROUND OF THE INVENTION

Field of the Invention

The present application relates generally to an improved data processing apparatus and method. In one aspect, the present application relates to a computing device, system, and method for processing electronic documents.

Description of the Related Art

Electronic document processing often requires the removal and redaction of highly sensitive information (e.g., customer data, personal information, personal financial and medical data, etc.) that cannot be made public. For example, before distributing or publishing an electronic document, the document author may want to remove some private, privileged, confidential, or otherwise sensitive information by blacking out the sensitive data with a black image block and destroying the original sensitive data so that the original sensitive information text has been obliterated by the blacking out process. When a document with redacted information is processed as an electronic record, the typical document ingestion process will scan the document into electronic form using an optical character recognition (OCR) process, but existing OCR processes will return blank or garbage characters for any redacted text block. In addition, existing techniques for creating redaction blocks do not disclose techniques for detecting or identifying redaction text blocks in an existing document. While there are existing systems which display to a user the extracted text data in a split screen with the original pdf image so that they can visual inspect the text and image together making the connection manually, this approach does not work at all for an unattended automated processing systems, but can only be used as an after-the-fact audit tool for automated systems. As seen from the foregoing, existing solutions for ingesting and processing redacted electronic documents are extremely difficult at a practical level in terms of accurately identifying and processing redaction blocks so that the document ingestion system correctly detects, categorizes, and handles document redactions.

SUMMARY

Broadly speaking, selected embodiments of the present disclosure provide a document processing system, method, and apparatus for detecting and locating redaction blocks and any associated text fragments in an electronic document to correctly categorize, identify, and process input data redactions while also discerning extracted text as redacted and not as missing, or as garbage characters that can typically be created as part of OCR conversion. In selected embodiments, the disclosed method, apparatus and system accurately detect, extract and represent redaction blocks in a document by transforming the document into a graphical or image file format, scanning the graphical/image file to identify any redaction blocks, associated text fragments, and corresponding location information so that the detected text fragments and locations can be mapped with corresponding redaction blocks and locations, thereby creating an output file that includes a true text representation of the original document with correct horizontal and vertical spacing and an accurate representation of redacted text blocks embedded in the document text. For example, by transforming a document into an image file (e.g., a pdf document), a redaction block detection process may be applied to scan each line of the image file to identify the presence and location of any redacted text blocks, such as by locating a minimum or threshold number of consecutive black pixels that are aligned in a minimum or threshold number of consecutive rows, and then computing the outline and/or position of each complete text block. In similar fashion, an OCR process may be applied to scan the image file to identify the presence and location of any associated text fragments. By mapping the location of each detected redacted text block to any corresponding text fragment, the document ingestion process can reconcile detected text blocks and text fragments and correctly categorize the input data as redacted. To assist with correct identification and processing of redacted text blocks, a sentinel string of predetermined characters may be inserted into the extracted electronic document for each detected redacted text block, thereby preventing the OCR process from returning blank or garbage characters for the redacted text block.

The foregoing is a summary that is provided to introduce a selection of concepts in a simplified form that are further described hereinbelow and thus contains, by necessity, simplifications, generalizations, and omissions of detail; consequently, those skilled in the art will appreciate that the summary is illustrative only and is not intended to identify key factors or essential features of the claimed subject matter, nor is it intended to be used to limit the scope of the claimed subject matter. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 1 and FIG. 1a depict a system diagram of a distributed data processing network that includes an information handling system for processing electronic documents in accordance with selected embodiments of the present disclosure;

FIG. 4 illustrates an example screen shot of an electronic document with redactions block and associated text fragments which are visually identified in accordance with selected embodiments of the present disclosure.

DETAILED DESCRIPTION

Figure 1:
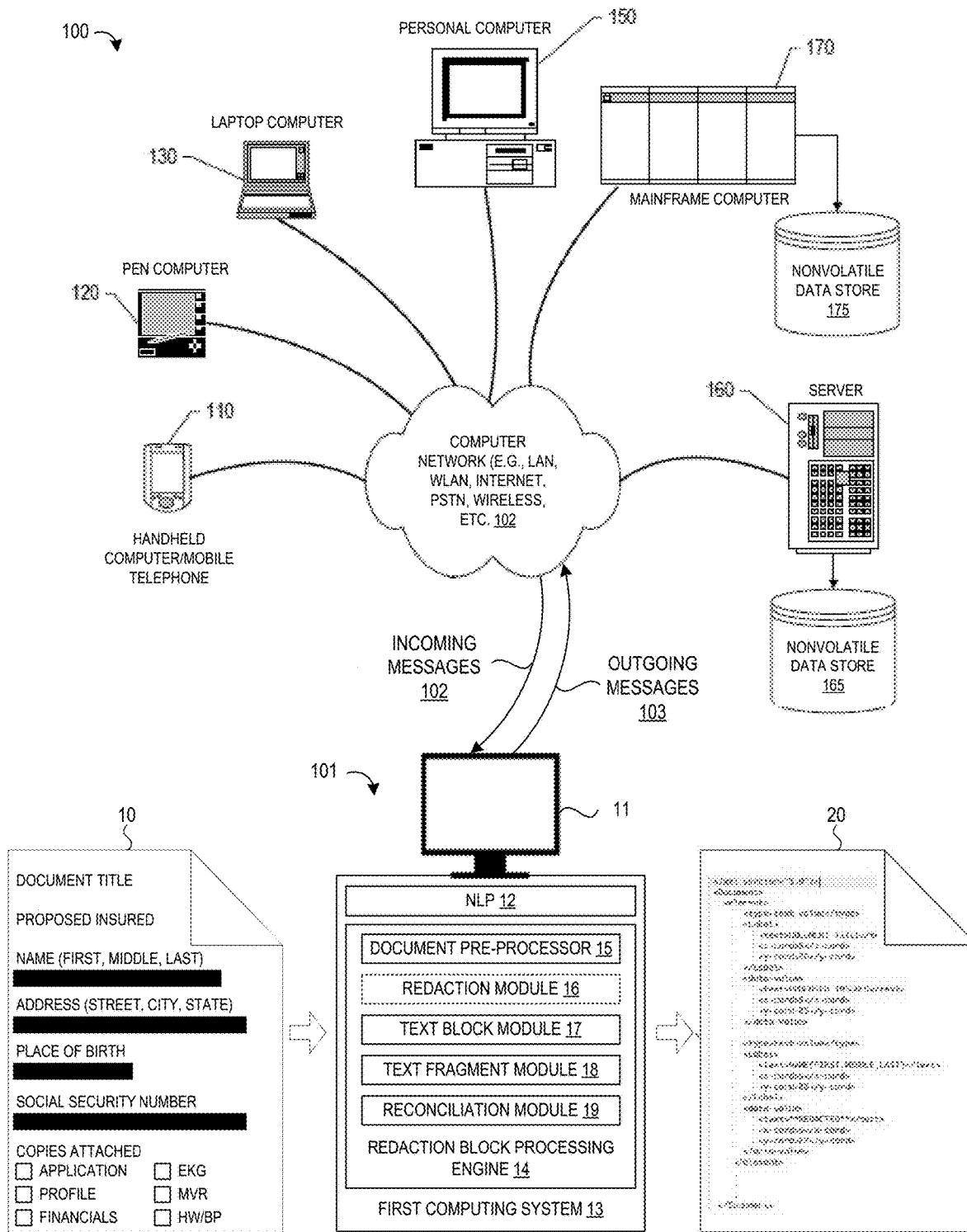

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of a computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a computer system in providing accurate detection, categorization, and processing of electronic documents which include redaction blocks.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a Public Switched Circuit Network (PSTN), a packet-based network, a personal area network (PAN), a local area network (LAN), a wide area network (WAN), a wireless network, or any suitable combination thereof. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a system diagram of a distributed data processing network, generally designated 100, that includes an information handling system 101 for processing input electronic documents 10 to generate output files 20 in accordance with selected embodiments of the present disclosure. FIG. 1 provides only an illustration of selected implementations and does not imply any limitations with regard to the environments in which different embodiments may be implemented. Many modifications to the depicted distributed data processing system may be made by those skilled in the art without departing from the scope of the invention as recited by the claims. In the distributed data processing network 100, the information handling system 101 is connected across a computer network 102 to receive incoming messages 102 and send outgoing messages 102 that are exchanged with one or more users at computing devices, such as a mobile phone 110, pen or tablet computer 120, laptop or notebook computer 130, personal computer system 150, server computer 160 and/or mainframe computer 170. Over the network 102, the computing devices communicate with each other and with other devices or components via one or more wired and/or wireless data communication links, where each communication link may comprise one or more of wires, routers, switches, transmitters, receivers, or the like. The network 102 is the medium used to provide communication links between various devices and computers connected together within distributed data processing network 100, and may include, for example, a telecommunications network, a local area network (LAN), a wide area network (WAN), such as the Internet, or a combination of the three, and includes wired, wireless, and/or fiber optic connections. Network 102 includes one or more wired and/or wireless networks that are capable of receiving and transmitting data, voice, and/or video signals, including multimedia signals that include voice, data, and video information. In this networked arrangement, the information handling system 101 and network 102 may enable question/answer (QA) generation functionality for one or more content users. Other embodiments of distributed data processing network 100 may be used with components, systems, sub-systems, and/or devices other than those that are depicted herein.

As shown in FIG. 1, the information handling system 101 may be embodied as a computing device which includes one or more processors or microcontrollers and associated memory storage devices which are connected and configured to implement a document processing functionality for processing documents for input and ingestion into a corpus of knowledge that is processed by a cognitive computing system. The configuring of the computing device 101 may comprise the providing of application specific hardware, firmware, or the like to facilitate the performance of the operations and generation of the outputs described herein with regard to the illustrative embodiments. In addition or in the alternative, the configuring of the computing device 101 may include storing software applications into the memory of the computing device 101 for causing one or more hardware processors of the computing device 101 to execute the software applications that configure the processor(s) to perform the operations and generate the outputs described herein with regard to the illustrative embodiments. Moreover, any combination of application specific hardware, firmware, software applications executed on hardware, or the like, may be used without departing from the spirit and scope of the illustrative embodiments. Thus, selected embodiments of the present disclosure may be implemented at the "device" level or at the "application" level It should be appreciated that once the computing device 101 is configured in one of these ways, it becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates efficient and accurate document processing by accurately detecting, extracting and representing redacted text blocks and associated text fragments in a document.

Though not shown, it will be appreciated that the overall structure of the computing device 101 includes an input/output interface unit, a network interface unit, a data store unit, and a processing unit. The input/output interface unit is connected and configured to provide a data connection to I/O on the computing device 101, such as a keyboard, a keypad, a touch screen, display screen and/or some other suitable input/output device, such as a document scanning device. In addition, the network interface unit is connected and configured to provide a communication link with other data processing systems or devices, such as by providing a network interface card for exchanging data via the network 102. The data store unit may be a separate storage which is separately accessed by individual applications running on the computing device 101 using one or more APIs. As disclosed herein, the processing unit may include a cognitive computing functionality which is implemented with software and/or hardware resources (e.g., processor(s) and memory) for running a document processing application that performs redaction block processing of input documents 10.

In selected example embodiments of the computing device 101, the cognitive power of the processing unit implements a redaction block processing engine 14 under control of a natural language processor (NLP) 12 to transform the input documents 10 into an image file (e.g., a pdf file), such as by using a document pre-processing module 15 to scan the input document 10 into a graphical format. As will be appreciated, any suitable image scanning technique may be used to transform and pre-process the document 10 into electronic form. For example, Adobe Acrobat is a family of application software and Web services for viewing, creating, manipulating, printing and managing files in Portable Document Format (PDF) and includes a function to perform an OCR process on an image document and create an output document that has text images converted to actual text.

In the computing device 101, the redaction block processing engine 14 may also include a redaction module 16 configured to provide computer program functionality for allowing a user to add redaction blocks as black rectangles to mask sensitive information in the document 10. As indicated with the dashed lines, the redaction module 16 is optionally provided to enable the user to add redaction blocks to the electronic document 10, such as the redaction blocks under the "Name," "Address," "Place of Birth" and "Social Security Number" fields. Alternatively, the input document 10 may be received with the redaction blocks already added so that redaction module processing is not required. The redacted block is typically a set of consecutive black pixels in the image that obliterates the original text image.

In addition, the redaction block processing engine 14 may include a text block module 17 that is configured to provide computer program functionality for reading every page of the input (e.g., PDF, png, jpg, word, PowerPoint, or any document format that can represent the document as an image) document 10 to detect any redaction blocks in the document 10. For example, the text block detection process 17 may be applied to scan each line of the image file to identify the presence and location of any redacted text blocks, such as by locating a minimum or threshold number of consecutive black pixels that are aligned in a minimum or threshold number of consecutive rows. As part of the redaction block detection process, the text block module 17 may also compute the outline and/or position of each complete redaction block. As will be appreciated, the text block module 17 detects redaction blocks for "text" and any other information (e.g., image information) that is obscured and masked by a redaction block. In addition, it will be appreciated that the text block module 17 is capable of distinguishing "blocks" from other text, labels, squares or checkboxes in the document 10 by virtue of implementing a suitable block detection algorithm. Example techniques for locating "black rectangles" (e.g., using the Hough Transform, Canny edge detection, etc.) can be adjusted to account for different types of redaction block shapes and colors, but the text block module 17 should also include a functionality for determining the location (e.g., specified x, y coordinates) for each detected redaction block.

As used herein, a redacted text block refers to a graphical element that visually removes, blocks or eliminates information in a document that may be sensitive or otherwise not suitable or desired for publication. Redacted text blocks are generally associated with document sanitization. In the example document 10, an example "text block" is the black rectangle appearing below the "Name" field. In addition, a text fragment refers to text in a page that is not redacted. In the example document 10, an example "text fragment" is the "DOCUMENT TITLE" label at the top of the page and the "NAME (FIRST, MIDDLE, LAST)" text. In addition, a "check box" refers to a graphical "box" in the document that can have a check mark, or is filled in. In the example document 10, there are "check boxes" at the bottom of the page. Finally, a table refers to a set of graphical grid lines in the document that represent a table of information.

In the redaction block processing engine 14, the text fragment module 18 is provided and configured with computer program functionality for reading every page of the input (e.g., PDF, png, jpg, word, etc.) document 10 to detect and read the text, labels, checkbox states, and tables on every page of the document 10, extracting the data in the proper context of the page. For example, the text fragment module 18 may apply an OCR process to scan the image file to identify the presence and location of any text fragments. As part of the text fragment detection process, the text fragment module 18 may compute the outline and/or position of each detected text fragment.

Finally, the redaction block processing engine 14 may include a reconciliation module 19 that is configured with computer program functionality to map between the location of the redacted text blackout blocks and the expected or associated text fragment or attribute. For example, when an overlap in location coordinates is detected between the expected text and a redacted text blackout block, the reconciliation module 19 may insert a sentinel string for the redacted text string. In another approach, the sentinel string may be inserted for the redacted text string when the redacted text blackout block is located within a specified distance of the associated text fragment. For example "<*REDACTED*>" may be inserted in place of any detected redaction block. Otherwise, the redaction block will have an incorrect and inconsistent value assigned from the OCR extracted value. The reconciliation module 19 may also generate an output text document with all text and redacted text blocks correctly extracted, such as by creating an XML output file with detailed coordinates of the text and redacted text blocks. Another feature of the reconciliation module 19 is the ability to update the original image file and show an outline of each redacted text block using a colored line to prove the accuracy of the algorithm extraction. Based on the computational results of the redaction block processing engine 14, an output file 20 is generated which includes the extracted text, including redacted block identification. Any suitable format for the output file 20 may be used, with an example XML, format of the output file 20 being illustrated in FIG. 1A and listed below:

```
<?xml version="1.0"?>
<Document>
    <element>
        <type>text-value</type>
        <Label>
            <text>DOCUMENT TITLE</text>
            <x-cord>5</x-cord>
            <y-cord>20</y-cord>
        </Label>
        <data-value>
            <text>PROPOSED INSURED</text>
            <x-cord>5</x-cord>
            <y-cord>25</y-cord>
        </data-value>
        <type>text-value</type>
        <Label>
            <text>NAME(FIRST,MIDDLE,LAST)</text>
            <x-cord>5</x-cord>
            <y-cord>20</y-cord>
        </Label>
        <data-value>
            <text>REDACTED</text>
            <x-cord>5</x-cord>
            <y-cord>27</y-cord>
        </data-value>
    </element>
    .
    .
    .
</Document>
```

Generally speaking, the redaction block processing engine 14 provides the ability to identify redacted text blocks within an input file 10 along with the locations of the redacted text blocks so that additional processing of the extracted text recognizes the blocks that are redacted and does not treat them as garbage or empty text blocks. In addition, the redaction block processing engine 14 provides the ability to correctly detect redacted text blocks and differentiate these from check-boxes and tables that also can be in image documents.

To provide additional details for an improved understanding of selected embodiments of the present disclosure, reference is now made to the example input document 10 wherein redaction blocks have been applied to mask name, address, place of birth, and social security number information which is considered as sensitive. Once identified by the text block and text fragment modules 17, 18, each redaction block and corresponding text fragment may be associated with the reconciliation module 19, such the redaction block for the fragment, "NAME (FIRST, MIDDLE, LAST)", may be represented as:
    NAME (FIRST, MIDDLE, LAST) ****************
    (Note: ***** is a black rectangle of redacted text).

To enhance the accuracy of processing the redaction blocks, the reconciliation module 19 may insert a string of predetermined characters (e.g., a sentinel marker) into the electronic document for each detected redacted text block. This may be implemented by using the OCR text output to create an output file 20 with an "accurate" text representation of the document that is different from the OCR-created text output, thereby preventing the OCR process from returning blank or garbage characters for the redacted text block. As a result, the output document 20 includes a modified OCR text document which correctly identifies the redacted blocks. For example, the redaction block associated with the text fragment, "NAME (FIRST, MIDDLE, LAST)", may be represented in the output file as:

NAME (FIRST, MIDDLE, LAST)<*REDACTED*>

In the finally-generated output file 20, the geometry of the redacted text blocks may be specified along with corresponding location information (e.g., x, y coordinates) in any suitable output format (e.g., XML, text, etc.) that shows all the text and text fragments with correct horizontal and vertical spacing to match the image document text spacing, and also includes <*REDACTED*> indicators for each of the extracted text fragments along with the start/end vertical spacing of the text and redacted blocks on the page. As will be appreciated, once an output file 20 is in an XML format, it is trivial to generate a "text" document representation of the data, and the XML x,y coordinates of the text block elements can be used to do the highlighting.

Figure 2:
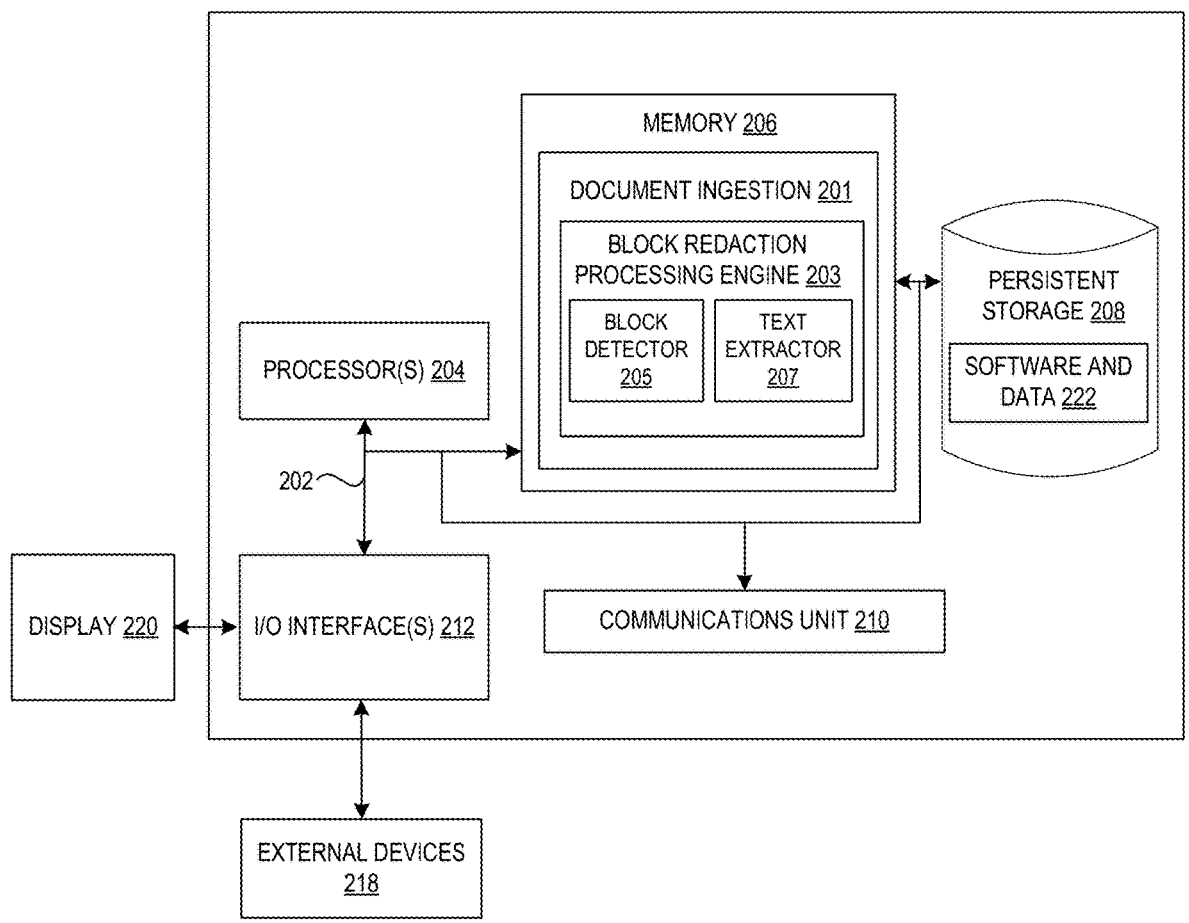
FIG. 2 is a block diagram of a processor and components of an information handling system such as those shown in FIG. 1.

As will be appreciated, the various types of information handling systems can utilize messaging applications which include redaction block processing engines disclosed herein, such as small handheld devices, computer/mobile telephones, personal digital assistants (PDAs), and personal entertainment devices, such as MP3 players, portable televisions, and compact disc players. Other examples of information handling systems include pen or tablet computers, laptop or notebook computers, personal computer systems, servers, large mainframe computer systems, and the like. An illustrative example of an information handling system showing an exemplary processor and various components commonly accessed by the processor is shown in FIG. 2 which depicts a block diagram of a processor and components of an information handling system 200 capable of performing the computing operations described herein. Information handling system 200 includes one or more processors 204 coupled over a processor interface bus 202 to various internal and external system components. It should be appreciated that FIG. 2 provides only an illustration of selected embodiments and does not imply any limitations with regard to the environments in which different embodiments may be implemented. Many modifications to the depicted environment may be made.

In the depicted example, the information handling system 200 includes one or more computer processor(s) 204 and memory 206 connected over a communications fabric 202 which provides communications between with persistent storage 208, communications unit 210, and input/output (I/O) interface(s) 212. Communications fabric 202 can be implemented with any architecture designed for passing data and/or control information between processors (such as microprocessors, communications, and network processors, etc.), system memory, peripheral devices, and any other hardware components within a system. For example, communications fabric 202 can be implemented with one or more buses.

Memory 206 and persistent storage 208 are computer readable storage media. In this embodiment, memory 206 may include random access memory (RAM) and/or cache memory. In general, memory 206 can include any suitable volatile or non-volatile computer readable storage media. Software and data 222 may be stored in persistent storage 208 for access and/or execution by processor(s) 204 via one or more memories of memory 206. In selected embodiments, the system memory 206 may store a variety of programs, including a document ingestion module 201 which may be invoked to activate a block redaction processing engine 203 which detects, locates and identifies redaction blocks and any associated text fragments in an electronic document so as to correctly categorize, identify, and process input data redactions.

In selected embodiments, persistent storage 208 includes a magnetic hard disk drive. Alternatively, or in addition to a magnetic hard disk drive, persistent storage 208 can include a solid-state hard drive, a semiconductor storage device, a read-only memory (ROM), an erasable programmable read-only memory (EPROM), a flash memory, or any other computer readable storage media that is capable of storing program instructions or digital information. The media used by persistent storage 208 may also be removable. For example, a removable hard drive may be used for persistent storage 208. Other examples include optical and magnetic disks, thumb drives, and smart cards that are inserted into a drive for transfer onto another computer readable storage medium that is also part of persistent storage 208.

Communications unit 210, in these examples, provides for communications with other data processing systems or devices. In these examples, communications unit 210 includes one or more network interface cards. Communications unit 210 may provide communications through the use of either or both physical and wireless communications links. Software and data 222 may be downloaded to persistent storage 208 through communications unit 210.

I/O interface(s) 212 allows for input and output of data with other devices that may be connected to computer 200. For example, I/O interface(s) 212 may provide a connection to external device(s) 218, such as a keyboard, a keypad, a touch screen, and/or some other suitable input device. External device(s) 218 can also include portable computer readable storage media such as, for example, a document or image scanner, thumb drives, portable optical or magnetic disks, and memory cards. Software and data 222 can be stored on such portable computer readable storage media and can be loaded onto persistent storage 208 via I/O interface(s) 212. I/O interface(s) 212 also connect to a display 220 which provides a mechanism to display data to a user and may be, for example, a computer monitor.

Figure 3:
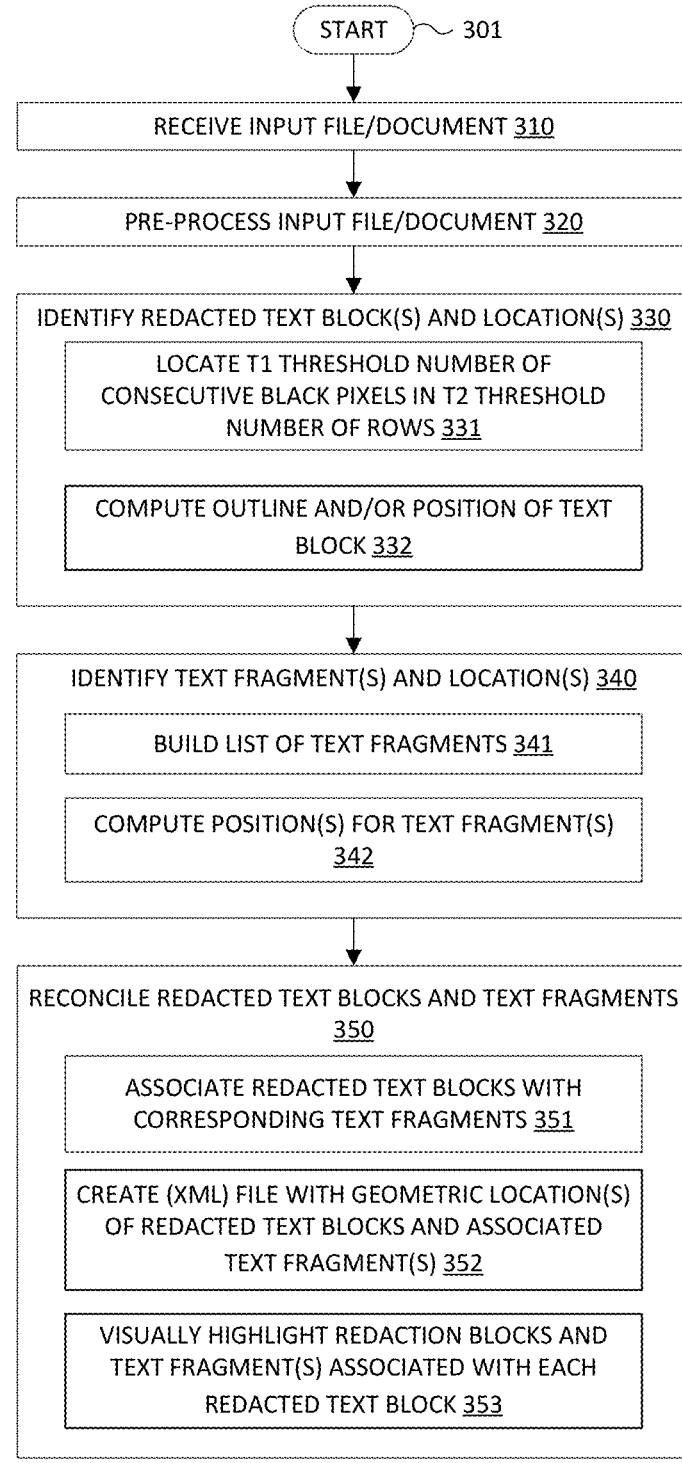
FIG. 3 illustrates a simplified flow chart showing the logic for detecting, extracting and representing redaction blocks in an electronic document in accordance with selected embodiments of the present disclosure.

To provide additional details for an improved understanding of selected embodiments of the present disclosure, reference is now made to FIG. 3 which depicts a simplified flow chart 300 showing the logic for detecting, extracting and representing redaction blocks in an electronic document. The processing shown in FIG. 3 may be performed by the computing device 101 or any other computer system, such as a cognitive system, other natural language question answering system, or the like.

FIG. 3 processing commences at step 301 whereupon, an input file or document is received at step 310. For example, a document may be received as a printed page or electronic file, such as a Microsoft word document or a PDF form file. At step 320, the input file or document is converted or transformed into a format that is suitable for document processing. For example, if the input document is a PDF form file (non-image format), then each page is converted to an image file (e.g., png format file) in gray scale that is suitable for image processing to detect redacted text blocks. Alternatively, each page of an input document may be transformed into an image file (e.g., a pdf form document). If the input document is already an image file (e.g., png format file) then no image conversion is needed.

Once pre-processing is complete, a redaction block detection process may be applied to identify redaction blocks and associated location information in each image file at step 330. While a variety of different redaction block detection algorithms can be used, an example approach disclosed herein is to scan each line of the image file to identify the presence and location of any redacted text blocks, such as by looking for a high density of black pixels that meet a threshold of a redacted block of text. For example, a first redaction block detection step 331 scans the image file to locate a minimum or threshold number (T1) of consecutive pixels of a specified color (e.g., black) that are aligned in a minimum or threshold number (T2) of consecutive rows. The threshold of consecutive black pixels in close proximity on the both the x-axis and y-axis prevent the false identification of thick lines, check-boxes, and tables in the document. Once a complete text block is identified, a second redaction block detection step 332 is performed to compute the outline and/or position of each complete text block. At a minimum, the processing at step 332 calculates the x, y coordinates of the outline of each redacted text block, and the location of all text blocks on each page is saved.

In selected embodiments, the redaction block detection processing at step 330 is applied to identify black box rectangles (redacted text blocks) by processing or scanning all rows of pixels of the image file. For each row, the pixels may be scanned from left to right to check for contiguous black pixels. If the number of contiguous black pixels on a row is greater or equal to a pre-defined value (called the rectanglexdensity), then a candidate width or base of a redacted text block rectangle is located. By then processing pixels on the following rows to find contiguous black pixels matching at least the same length, a candidate redacted text block rectangle is identified until a non-matching row is detected. By requiring that a candidate redacted text block rectangle have a minimum width and height (as specified by a rectangle y-axis density and x-axis density measurement meeting or exceeding pre-defined threshold values), then the processing at step 330 may definitively identify a redacted text block rectangle. In the redaction block identification processing (or later), an output file (e.g., an externalized configuration file) may be generated to enable visual confirmation of what redaction block has been identified. This may be done by highlighting the redaction blocks using colored lines in the output image file in this code (e.g., a green outline line may be used to show the boundaries of the detected redacted text block).

Once the redaction blocks on a page are identified, a text fragment detection process may be applied to identify text and associated location information in each image file at step 340. While a variety of different text recognition algorithms can be used, an example approach disclosed herein is to perform an OCR scan of the image file to identify the presence and location of any text. For example, a first text identification step 341 scans the original document and detects the location of all text fragments in the document based on OCR embedded text. Once the text fragments are identified, a second text identification step 342 is performed to compute the outline and/or position of each text fragment. At a minimum, the processing at step 342 calculates and saves the x, y coordinates of text fragment. As a result of the OCR process applied during the text fragment detection step 340, all text fragments on a page are identified to build a list of all text fragments with their x, y positions. As will be appreciated, there other algorithms available for returning the x,y coordinates of each text block on a page from document that has been OCRed, such as the open source library called PDFBox that can read an input PDF file that has been OCRed using Adobe Acrobat. The output OCR document is a transformed input file that has actual text added to the original images. In this example, the input to Adobe Acrobat is an image file, and the output is a pdf file that preserves the images, but embeds text in the document.

With the redaction blocks and text fragments identified, a final resolution step 350 reconciles the text fragments detected and their x, y coordinates with any redacted text blocks detected and their x, y coordinates. While a variety of different reconciliation algorithms can be used, an example approach disclosed herein is to use the location coordinates to map or associate redacted text blocks with corresponding text fragments at step 351. In addition, the reconciliation process may create an output file at step 352 with geometric locations of redacted text blocs and associated text fragments. For example, an output file can be created in a specified format (e.g., XML, JSON, YAML, or the like) that includes a true text representation of the original document with correct horizontal and vertical spacing and an accurate representation of redacted text blocks embedded in the document text. When the detected the x,y coordinates of all text and the redacted text blocks are included in the XML file, this "metadata" of coordinates can be used to accurately create an output text document that shows the original vertical and horizontal spacing of the input document. To assist with correct identification and processing of redacted text blocks, the processing at step 352 may insert a sentinel string of predetermined characters into the output file for the electronic document for purposes of identifying each detected redacted text block, which is a correction from the OCR process text output which typically contains blank or garbage characters for the redacted text block. In addition or in the alternative, the reconciliation process may create an updated image file that visually highlights the detected redaction blocks and any associated test fragments at step 353. At this point, the document processing methodology ends or returns to step 310 to receive the next input file/document.

In selected embodiments, the reconciliation processing at step 350 is applied to associate each detected redaction block with any corresponding text fragment. This may be achieved by comparing the positions of the text fragments with the ones of the rectangles. For example, with fixed forms the locations of form labels do not change and only the data elements can change, the labels on a fixed form have predetermined x, y coordinates and text values. The data values are physically near the labels and associating the text values to the labels can easily be done by detecting the labels in the OCR text using known x, y location coordinates, and then identifying the data values associated with each label. In addition, the x, y coordinates of all the redacted blocks can also be used along with the label and data to provide a straightforward mapping of where redacted blocks overlay form data. Some documents are in the form of unstructured text (e.g., medical forms with extended data entry fields for medical notes), in which case the redaction block identifier (e.g., sentinel label) may be inserted in-line into the text fragment based on the mapping of the text x, y, coordinates mapped to the redacted block x, y coordinates. In the processing at step 350, an output text file may be created with all text fragments and redacted text blocks correctly extracted and shown in the correct vertical and horizontal spacing of the original document. In addition or in the alternative, an updated image file may be generated to visually display the outline of every detected text fragment and redacted text block. For example, an XML output file may be created which shows all of the detailed information including all text and metadata that shows the accurate x, y coordinates of all elements.

As will be appreciated, the processing at steps 310, 320, 330, 340, 350 may be performed at the computing device 101, or other information handling system having the required computing capabilities. In addition, the described methodology 300 is provided with reference to detecting and locating text redaction blocks and any associated text fragments. However, it will be appreciated that the present disclosure can be applied to other redaction blocks and document content, such as the image or graphics related information on an electronic document. In all such embodiments, the disclosed methodology provides an automated approach for accurately extracting and representing both the original (unredacted) text and all redacted text blocks so that additional ingestion processing by other systems can then correctly show an accurate representation of the original document including the redacted blocks that traditional systems cannot preserve.

Figure 4:
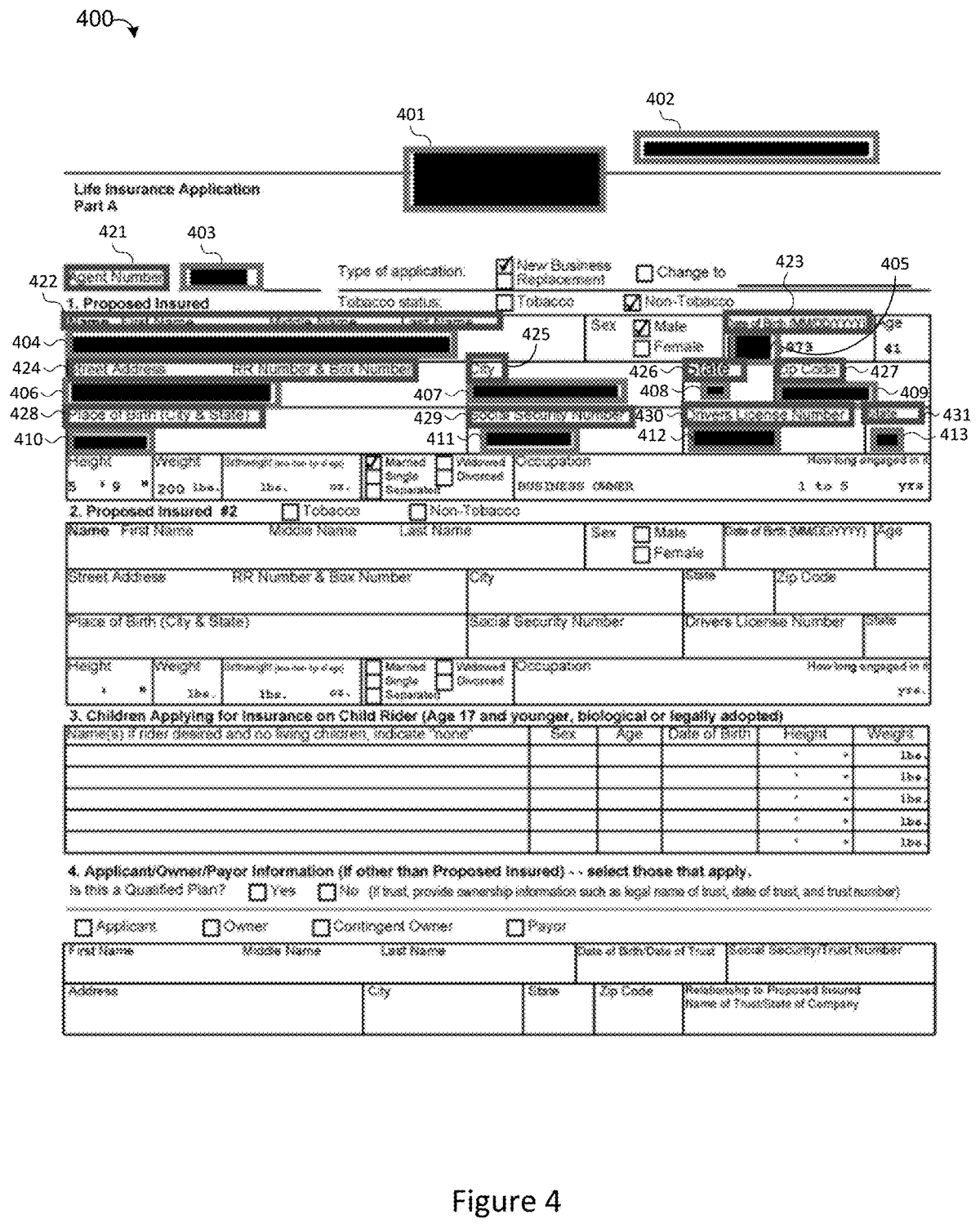

Turning now to FIG. 4, there is shown an example user interface screen shot 400 of an electronic document with redaction blocks and associated text fragments which are visually identified in accordance with selected embodiments of the present disclosure. In the screen shot 400, a life insurance application form includes a number of redaction blocks, each identified with a green rectangle 401-413. As a result of the redaction block processing, the output file will be generated to include geometric shape and/or location information for each redaction block along with any sentinel string of predetermined characters and information specifying the location, shape, and color of visual highlight rectangles 401-413. In addition, the depicted life insurance application form includes a number of associated text fragments, each identified with a blue rectangle 421-431. As a result of the text fragment processing, the output file will be generated to include the detected text fragment and corresponding location information along with information specifying the location, shape, and color of visual highlight rectangles 421-431. As shown, some of the detected redaction blocks (e.g., the blocks 401, 402 at the top of the page) do not have associated text fragments. However, other redaction blocks have associated text fragments. For example, the text fragment "Agent Number" (identified at 421) is associated in the output file with a corresponding redaction block (identified at 403) which is located immediately to its right. In addition, the text fragment "Name: First Name Middle Name Last name" (identified at 422) is associated in the output file with a corresponding redaction block (identified at 404) which is located immediately below the associated fragment. Though not shown, it will be appreciated that additional visual highlighting may be added to identify detected text fragments that are not associated with redaction blocks, such as by using rectangles having a different color (e.g., red).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

By now, it will be appreciated that there is disclosed herein a system, method, apparatus, and computer program product for automatically detecting redaction blocks in a document with an information handling system having a processor and a memory. As disclosed, the system, method, apparatus, and computer program product receives an input document as an image file having embedded text and redaction blocks which may be blacked-out areas in the document. By analyzing the document as an image file, any redaction block areas in the document are identified. In selected embodiments, the document analysis is performed by applying a redaction block detection process to scan each line of the image file to identify any redacted text blocks by locating a threshold number $T1$ of consecutive black pixels that are aligned in a threshold number $T1$ of consecutive rows. In addition, the disclosed system, method, apparatus, and computer program product detect location information for each redaction block area identified in the document. The process for detecting location information may include computing a geometric shape and x, y coordinates for each redaction block area. In selected embodiments, additional processing may be performed to classify each identified redaction block area as a type $Ti$ selected from a group consisting of a text block, a table cell, a checkbox, and unknown. In such embodiments, the type $Ti$ may be, for example, the checkbox which classifies a redaction block area located over a group of labels in the document. In selected embodiments, additional processing may be performed to apply optical character recognition to the document to detect text fragments in the document, to detect location information for each text fragment identified in the document, and to map each redaction block area to any associated text fragments in the document based on the location information for each redaction block area and text fragment in the document. In addition, additional processing may be performed to insert a sentinel string of predetermined characters into the document for each detected redaction block area.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for automatically detecting redaction blocks in a document comprising:
   receiving, by an information handling system comprising a processor and a memory, the document as an image file;
   analyzing, by the information handling system, the document to identify any redaction block areas in the document;
   detecting, by the information handling system, location information for each redaction block area identified in the document;
   applying, by the information handling system, optical character recognition to the document to detect text fragments in the document;
   detecting, by the information handling system, location information for each text fragment identified in the document; and
   mapping, by the information handling system, each redaction block area to any associated text fragments in the document based on the location information for each redaction block area and text fragment in the document,
   wherein the redaction block areas are redacted block areas.

2. The method of claim 1, further comprising classifying, by the information handling system, each identified redaction block area as a type Ti selected from a group consisting of a text block, a table cell, a checkbox, and unknown.

3. The method of claim 2, where the type Ti is the checkbox which classifies a redaction block area located over a group of labels in the document.

4. The method of claim 1, where each redaction block area is a blacked-out area in the document.

5. The method of claim 1, where detecting location information comprises computing, by the information handling system, a geometric shape and x, y coordinates for each redaction block area.

6. The method of claim 1, further comprising inserting, by the information handling system, a sentinel string of predetermined characters into the document for each detected redaction block area.

7. The method of claim 1, where analyzing the document comprises applying a redaction block detection process to scan each line of the image file to identify any redacted text blocks by locating a threshold number T1 of consecutive black pixels that are aligned in a threshold number T1 of consecutive rows.

8. An information handling system comprising:
   one or more processors;
   a memory coupled to at least one of the processors;
   a set of instructions stored in the memory and executed by at least one of the processors to automatically detect redaction blocks in a document, wherein the set of instructions are executable to perform actions of:
   receiving, by the system, the document as an image file;
   analyzing, by the system, the document to identify any redaction block areas in the document;
   detecting, by the system, location information for each redaction block area identified in the document;
   applying, by the system, optical character recognition to the document to detect text fragments in the document;
   detecting, by the system, location information for each text fragment identified in the document; and
   mapping, by the system, each redaction block area to any associated text fragments in the document based on the location information for each redaction block area and text fragment in the document,
   wherein the redaction block areas are redacted block areas.

9. The information handling system of claim 8, where the set of instructions are executable to classify, by the system, each identified redaction block area as a type Ti selected from a group consisting of a text block, a table cell, a checkbox, and unknown.

10. The information handling system of claim 9, where the type Ti is the checkbox which classifies a redaction block area located over a group of labels in the document.

11. The information handling system of claim 8, where each redaction block area is a blacked-out area in the document.

12. The information handling system of claim 8, where the set of instructions are executable to detect location information by computing a geometric shape and x, y coordinates for each redaction block area.

13. The information handling system of claim 8, where the set of instructions are executable to insert, by the system, a sentinel string of predetermined characters into the document for each detected redaction block area.

14. The information handling system of claim 8, where the set of instructions are executable to analyze the document by applying a redaction block detection process to scan each line of the image file to identify any redacted text blocks by locating a threshold number T1 of consecutive black pixels that are aligned in a threshold number T1 of consecutive rows.

15. A computer program product stored in a computer readable storage medium, comprising computer instructions that, when executed by an information handling system, causes the system to automatically detecting redaction blocks in a document by performing actions comprising:
   receiving, by the system, the document as an image file;
   analyzing, by the information handling system, the document to identify any redaction blocks in the document, wherein each redaction block is a redacted block;
   detecting, by the information handling system, location information for each redaction block identified in the document;
   applying, by the information handling system, optical character recognition to the document to detect text fragments in the document;
   detecting, by the information handling system, location information for each text fragment identified in the document;
   mapping, by the information handling system, each redaction block to any associated text fragments in the document based on the location information for each redaction block and text fragment in the document;
   classifying, by the system, each identified redaction block as a redaction block type Ti selected from a group consisting of a text block, a table cell, a checkbox, and unknown; and
   generating, by the system, an output file which identifies, for the document, each text fragment and associated text fragment location information, along with each redaction block and associated redaction block fragment location information and redaction block type Ti.

16. The computer program product of claim 15, further comprising computer instructions that, when executed by the information handling system, causes the system to insert a sentinel string of predetermined characters into the document for each detected redaction block.

17. The computer program product of claim 15, where analyzing the document comprises applying a redaction block detection process to scan each line of the image file to identify any redacted text blocks by locating a threshold number T1 of consecutive black pixels that are aligned in a threshold number T1 of consecutive rows.

\* \* \* \* \*